Patented Nov. 3, 1936

2,059,647

UNITED STATES PATENT OFFICE 2,059,647

COMPOUNDS OF THE BENZANTHRONE SERIES

Melvin A. Perkins, Milwaukee, Wis., assignor to E. I. du Pont de Nemours & Company, Wilmington, Del., a corporation of Delaware No Drawing. Application May 25, 1935, Serial No. 23,456

6 Claims. (Cl. 260—61)

This invention relates to the preparation of new compounds of the benzanthrone series and more particularly to the preparation of Bz2-halogen-benzanthrones which contain simple reactive monovalent substituents in the Bz1 position.

Bz2-chloro-benzanthrone having a melting point of 190° C. has been prepared according to Swiss Patent 122,904 by nitrating benzanthrone, reducing the nitro compound to the corresponding amine, acetylating the amine group and chlorinating the resulting product, with subsequent deacetylation and deamidation.

I have now found that new and valuable derivatives of benzanthrone can be prepared by substituting for the amine group of Bz1-amino-Bz2-chloro-benzanthrone other reactive substituents such as halogen, —NO₂, —SO₃H, —SH and —SeH, or by the direct substitution of such reactive substituents in the Bz1 position of Bz2-halogen-benzanthrone. These compounds are suitable for the preparation of new and valuable dyestuffs.

In carrying out my invention for the preparation of Bz1,Bz2-dihalogen-benzanthrones, I may halogenate Bz2-halogen-benzanthrone by any of the general methods used for the halogenation of anthraquinone compounds, or I may prepare the dihalogen-benzanthrone by reacting Bz2-halogen-benzanthrone diazonium sulfate with a halide, according to the well-known Sandmeyer reaction, thereby obtaining directly Bz1,Bz2-dihalogen-benzanthrone.

The Bz2-halogen-benzanthrone may be nitrated or sulfonated to prepare the corresponding Bz2-halogen-Bz1-nitro or sulfo derivatives, and the Bz2-halogen-Bz1-selenides or sulfides may be prepared from the Bz2,Bz1-dihalogen-benzanthrones by the methods described in U. S. Patents 1,965,855, 1,972,960 or 1,977,242. The Bz2-halogen substituted benzanthrones carrying halogen, sulfide or selenide groups in the Bz1 position are especially suitable for condensation to dibenzanthrone and isodibenzanthrone compounds.

It is therefore an object of the present invention to prepare new and useful compounds of the benzanthrone series having the general formula

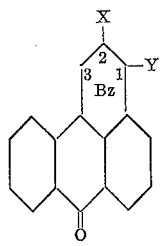

wherein X is a halogen atom and Y is a monovalent reactive substituent of the class consisting of chlorine, bromine, iodine, —NO₂, —SO₃H, —SH, —SeH, and wherein the anthraquinone nucleus may contain simple monovalent groups such as methyl, halogen, sulfo, hydroxy, etc.

The following examples are given to more fully illustrate my invention. Parts used are by weight.

Example 1

74 parts of Bz2-chloro-Bz1-amino-benzanthrone (M. P. 265° C.) are diazotized at 10–20° C. in the usual manner, by sprinkling 20 parts of sodium nitrite into the solution in 740 parts of 66° Bé. sulfuric acid and stirring until a sample gives a clear yellow solution in water. The diazonium sulfate is then precipitated by pouring the solution carefully onto 1200 parts of cracked ice, with careful agitation, keeping the temperature below 20° C. The resulting thick, yellow mass is poured slowly into alcohol (about 4000 parts, and advantageously containing freshly prepared cuprous oxide) at about 70° C. and the mass stirred and heated to 80° for a few minutes to complete the libration of nitrogen gas. The slurry is then diluted well with water, filtered and washed. The cake is then boiled up with dilute nitric acid in order to dissolve copper compounds, filtered again, washed acid free and dried.

The crude Bz2-chloro-benzanthrone thus obtained contains less than 0.5% nitrogen, about 13% chlorine, and melts at about 170–180° C. It is very soluble in most organic solvents but crystallizes from acetic acid to which a very small amount of water has been added. After one or two such recrystallizations the product is obtained as a pale yellow solid melting at 185–188° C. and containing 13.4% chlorine. The solution in sulfuric acid is brownish orange. Oxidation by chromic acid in acetic acid gives a chlorine-free anthraquinone-1-carboxylic acid, showing the chlorine to be in the "Bz" ring. When mixed with the known Bz1-chloro-benzanthrone (M. R. 180–182°), the mixture shows a decided depression, melting at 130–140° C.

Example 2

77 parts of Bz2-chloro-Bz1-amino-benzanthrone are diazotized according to the procedure of Example 1 and the diazonium sulfate precipitated by pouring on ice. The yellow precipitate is filtered off and sucked as dry as possible. The filter cake is then slurried in about 700 parts of 20° Bé. hydrochloric acid until all lumps are broken up, and this suspension is added slowly under the surface of a solution of 55 parts of cuprous chloride in 550 parts of 20° Bé. hydrochloric acid. When the evolution of nitrogen slows up, the mass is heated and slightly diluted until a temperature of 90° C. is reached. It is maintained at 90° until gas evolution ceases completely, then diluted, filtered, washed and dried.

The crude Bz1,Bz2-dichloro-benzanthrone thus obtained is a pale yellow solid containing 21–22% chlorine and melting at about 250–255° C. After recrystallization from 24 parts of solvent naphtha to which filter-cel and decolorizing carbon have been added, then from 10 parts of nitrobenzene, Bz1,Bz2-dichloro-benzanthrone of M. P. 266° C. and containing 23.2% chlorine is obtained as brilliant, shining, yellow crystals (needles). It dissolves in sulfuric acid with a bright red color.

In this example, as elsewhere, whenever Bz2-chloro-Bz1-amino-benzanthrone is diazotized, an equivalent quantity of Bz2-chloro-Bz1-acetyl-amino-benzanthrone can be used. In such a case, the sulfuric acid solution of the starting material is first heated to 80–90° for about ½ hour in order to hydrolyze off the acetyl group; then the solution is cooled and the diazotization started.

By using cuprous bromide and hydrobromic acid instead of cuprous chloride and hydrochloric acid, Bz2-chloro-Bz1-bromo-benzanthrone is obtained. After purification, it melts at 248° C.

By using a solution of potassium iodide to decompose an aqueous suspension of the diazonium sulfate obtained in the above example, a crude Bz2-chloro-Bz1-iodo-benzanthrone, melting at 212–220° (uncorr) is obtained as a pale yellow powder which is very soluble in benzene or its derivatives and only sparingly soluble in hot acetic acid or in hot alcohol.

*Example 3*

20 parts of Bz2-chloro-benzanthrone, obtained as in Example 1, are dissolved at room temperature in 200 parts of 15% oleum and the solution stirred, without heating, until a test sample shows the product to be completely soluble in water, which is the case in about 2 hours. The solution is drowned in about 2500 parts of cold water, forming a gelatinous mass. This is heated to 90° and becomes a dark yellow-brown, thin solution. After the addition of 250 parts of sodium chloride, which again gelatinizes the mass, a brownish yellow amorphous solid separates out upon cooling. This is filtered off, washed with 10% NaCl solution and dried. The product, apparently Bz2-chloro-benzanthrone-Bz1-sodium sulfonate, is not decomposed by boiling with a dilute acid solution of potassium chlorate, but readily forms a sulfonyl chloride by treatment of 24 parts (of the above product, containing some salt) with 15 parts of phosphorus pentachloride in 200 parts of chlorobenzene and filtering off the yellow crystals.

This product, apparently Bz2-chloro-Bz1-benzanthrone-sulfonyl chloride, melts at 242–249° (uncorr) and contains 8.3% sulfur and 18.7% chlorine. By treatment with dry ammonia in nitrobenzene at 150°, the corresponding Bz2-chloro-benzanthrone-sulfonamide (M. R. 308–309°; 4.1% nitrogen) is obtained.

By using Bz1,Bz2-dichloro-benzanthrone (M. R. 266°), instead of Bz2-chloro-benzanthrone in the above example, a mono-sulfo-Bz1,Bz2-dichloro-benzanthrone (sodium salt) is obtained in the same way. It is a rich yellow solid.

*Example 4*

26.4 parts of Bz2-chloro-benzanthrone are dissolved in 130 parts of dry nitrobenzene and 0.2 parts of iodine are added. 8.8 parts of bromine are then added dropwise at room temperature, followed by 7.4 parts of sulfuryl chloride (to oxidize HBr formed in bromination). The mixture is stirred for 18 hours and then warmed to 80–90° for 6 hours. It is then cooled, filtered, washed with a little nitrobenzene and then with alcohol. The product, apparently Bz2-chloro-Bz1-bromo-benzanthrone, appears as tiny, clean-cut, greenish yellow needles under the microscope. It contains one atomic proportion each of bromine and chlorine, melts at 248°, gives a bright red color in sulfuric acid, and appears identical with the product obtained by diazotizing Bz2-chloro-Bz1 amino-benzanthrone and treating with cuprous bromide (Example 2).

By using an equivalent quantity of Bz2-bromo-benzanthrone (prepared from Bz2-amino-benzanthrone by replacing the amino group with bromine by the well known Sandmeyer reaction) instead of Bz2-chloro-benzanthrone as the starting material for this example, Bz1,Bz2-dibromo-benzanthrone (M. R. 239–241°; 40% bromine; color in sulfuric acid—cerise red) is obtained.

*Example 5*

10 parts of Bz2-bromo-benzanthrone are suspended in 50 parts of nitrobenzene and 5 parts of 94% nitric acid added dropwise at below 40° C. The solution is warmed at 50–60° C. for about 2 hours after which the temperature is further raised to 80–85° and maintained for about 1 hour. Upon cooling, a pale yellow solid crystallizes out and is filtered off, preferably after dilution with alcohol. The product obtained gives correct analytical figures for a mononitro-Bz2-bromo-benzanthrone and melts at 261–264° C. Reduction gives an amino compound, apparently Bz2-bromo-Bz1-amino-benzanthrone. The acetyl derivative melts at 266–267° C.

*Example 6*

29.9 parts of Bz1,Bz2-dichloro-benzanthrone (brought into a finely divided state by acid pasting, for example) is added along with 100 parts of ethyl alcohol, to a solution of 12 parts of sulfur in 200 parts of sodium sulfide, (about 15%) solution, and the mixture heated to reflux (81–82° C.) under agitation for 15 to 20 hours. The yellow solid disappears and a red-violet solution forms. Upon cooling, a semi-solid mass of long orange-brown needle crystals is obtained. These are filtered off, and washed with 20% NaCl solution until a clear filtrate is obtained. The filter cake of Bz2-chloro-benzanthrone-Bz1-sodium mercaptide can be used as such for condensations or can be dried without serious decomposition as evidenced by its ready solubility in hot or cold water with an intense violet-red color. It contains one atom of chlorine and condenses with halogen compounds to give thio-ethers. That the mercapto group is in the 3 position is evidenced by the fact that when condensed with Bz1-halogen-benzanthrones, the products have the properties of Bz1,Bz1'-dibenzanthronyl thioether.

By using a solution of sodium selenide instead of sodium polysulfide in the above example, a similar product containing selenium is obtained.

*Example 7*

40 parts of Bz2-chloro-benzanthrone are suspended in 100 parts of dry nitrobenzene and 0.2 part of iodine are added. The mixture is heated to 70° C. and 25 parts of sulfuryl chloride are added dropwise, under agitation, over a 10-hour period, at about 70° C. After stirring 2 hours longer at 70°, the mass is allowed to cool, is diluted with a little nitrobenzene (in order to enable pouring of the mass), filtered and washed nitrobenzene-free by means of alcohol. Crude Bz1,Bz2-dichloro-benzanthrone is obtained in good yield. By recrystallization from solvent naphtha, to which filter-cel and decolorizing carbon are preferably added, Bz1,Bz2 - dichloro - benzanthrone of good purity is obtained. It shows no depression of the melting range when mixed with Bz1,Bz2-dichloro-benzanthrone obtained according to the procedure of Example 2 (first part).

Bz2-bromo-benzanthrone may be used in place of Bz2-chloro-benzanthrone in this example, the product being largely Bz2-bromo-Bz1-chloro-benzanthrone (M. R. 240–242°) (yellow needles from solvent naphtha).

The use of Bz2-bromo-benzanthrone (40 parts) and a double proportion of sulfuryl chloride (44 parts) results in the formation of a dichloro-Bz2-bromo-benzanthrone of M. R. 200–205°. (Color in sulfuric acid—intense bright red.)

Example 8

20 parts of Bz1,Bz2-dichloro-benzanthrone are added, with ice cooling, to 200 parts of 94% nitric acid, keeping the temperature at 10 to 20° C. The solid dissolves very rapidly as it is added and a new solid appears even before all of the original material has been added. The yellow suspension is stirred for 2 hours and then filtered on an acid resisting, porous surface. The bright greenish-yellow needles thus obtained are washed, first with concentrated nitric acid (sp. gr. 1.42), then with water, and dried. The crude nitrated body melts at about 310° C., but after a single crystallization from nitrobenzene, the melting point is raised to 323–324° C. The product appears from analysis to be a dinitro-Bz1,Bz2-dichloro-benzanthrone.

A mononitro-Bz1,Bz2-dichloro - benzanthrone can be obtained according to the general procedure of Example 5, but the Bz1,Bz2-dichloro-benzanthrone used must be finely divided (not crystalline), as, for example, by acid pasting and drying. The mononitro-Bz1,Bz2-dichloro-benzanthrone thus obtained melts at 318–320° C., and is a bright yellow solid, much less greenish than the dinitro compound (above).

Example 9

16 parts of Bz2-chloro-Bz1-acetylamino-beta-chloro-benzanthrone (which is obtainable from the beta-chloro-benzanthrone obtained by reacting 2-chloro-anthraquinone, glycerine, sulfuric acid and a reducing agent (German Patent 205,294) by (a) nitration in nitrobenzene, (b) reduction of the nitro compound by sodium sulfide, (c) acetylation of the resulting amine, and, finally, (d) chlorination of the Bz1-acetylamino-beta-chloro-benzanthrone with sulfuryl chloride in nitrobenzene in the presence of iodine) are dissolved in 160 parts of 98% sulfuric acid. The solution is heated to 80–90° for 1 hour in order to hydrolyze the acetylamino group. The end of the hydrolysis is indicated by drowning a few drops of the solution in water, whereupon a dark red, gelatinous precipitate of the free amine is formed. The solution is then cooled to 10–20° and diazotized according to the procedure given in Example 2. The diazonium sulfate filter cake is suspended in 170 parts of 20° Bé. hydrochloric acid and added to a solution of 10 parts of cuprous chloride in 100 parts of 20° Bé. hydrochloric acid. The greenish yellow solid which forms upon heating and diluting is isolated as usual. It melts at about 235–242° C. (uncorr) and gives a bright red color in sulfuric acid. It crystallizes beautifully from ortho-dichlorobenzene. The mixture of isomeric Bz1,Bz2-beta-trichloro-benzanthrones can, in this way, be separated into two mixtures, one melting at 258–268° C. and highly crystalline, the other melting at 224–237°, a pale greenish-yellow powder.

By using in this example an equivalent quantity of Bz2-chloro-Bz1-acetylamino-2-methyl-benzanthrone of M. R. 266–268° C. (obtainable by the same series of reactions as indicated in the case of Bz2-chloro-Bz1-acetylamino-beta-chloro-benzanthrone from 2-methyl-benzanthrone, M. P. 199° C.) in place of Bz2-chloro-Bz1-acetylamino-beta-chloro-benzanthrone, there is obtained Bz1, Bz2-dichloro-2-methyl-benzanthrone. It crystallizes from nitrobenzene in sparkling, brownish-yellow needles melting at 213–220° C.

Example 10

27 parts of Bz1,Bz2-dichloro-benzanthrone, in a finely divided state, are stirred in 400 parts of ethyl alcohol with 5 parts of selenium powder, 8.8 parts of calcium hydroxide and 0.3 part of copper powder, and the mixture heated in a pressure vessel to 180–185° C. for 18 hours.

Bz2,Bz2′ - dichloro - Bz1,Bz1′ - dibenzanthronyl selenide is present as a yellow crystalline solid. It is filtered off and freed of lime by extraction with hot, dilute hydrochloric acid. The compound is very sparingly soluble, even in hot nitrobenzene from which it crystallizes almost completely as greenish-yellow, hair-like needles of M. R. 381–383° C. The solution in sulfuric acid exhibits a very characteristic phenomenon, being greenish-blue in very thin layers or in very dilute solution, and red-violet in thick layers or high concentration.

The same product is obtained with the use of a high boiling solvent, such as kerosene or tetraline, at atmospheric pressure.

Sulfur can be substituted for selenium in this example with good results. The Bz2,Bz2′-dichloro-Bz1,Bz1′-dibenzanthronyl sulfide crystallizes from nitrobenzene in thin yellow needles, melting at 395–397° C. and gives somewhat more reddish solutions in sulfuric acid than the corresponding selenide.

Similar products are obtained when Bz2-chloro-Bz1-iodo-benzanthrone is substituted for the Bz1,Bz2-dichloro-benzanthrone as starting material in this example.

As illustrated above in Example 9, Bz1,Bz2-dihalogen-benzanthrones containing other substituents in the anthraquinone nucleus may be prepared by starting with substituted anthraquinone compounds. Other alpha or beta-halogen-anthraquinones, such as alpha- or beta-iodo- or bromo-anthraquinone, anthraquinone sulfo acids, 2-hydroxy-anthraquinone or other substituted anthraquinones wherein the substituents are not reacted upon during the diazotization or subsequent decomposition of the amino compound may be used in place of those specifically mentioned in Example 9.

The Bz1,Bz2-dihalogen-benzanthrones are particularly adapted for further condensation with other compounds, such as amino-anthraquinone compounds, to form dyestuffs, for example, Bz1,Bz2-dichloro-benzanthrone may be condensed with 1-amino-anthraquinone to give an intermediate for olive-green vat dyestuffs. Similarly, Bz1,Bz2-dichloro-benzanthrone may be condensed with aniline to give the corresponding Bz2-chloro-Bz1-anilido-benzanthrone.

It is understood that diazotization of the amine compound may be effected by any known method, for example, the diazotization may be carried out in hydrochloric or acetic acid solutions or suspensions, and by use of organic nitrites, nitrous oxides, etc.

I claim:

1. A Bz2-halogen-benzanthrone containing in the Bz1 position a reactive negative substituent of the group consisting of Cl, Br, I, —$NO_2$, —$SO_3H$, —SH, —SeH.
2. A Bz1,Bz2-dihalogen-benzanthrone.
3. Bz2-halogen-benzanthrone containing in the Bz1 position a reactive negative substituent of the group consisting of Cl, Br, I, —$NO_2$, —$SO_3H$, —SH, —SeH.
4. Bz1,Bz2-dihalogen-benzanthrone.
5. Bz1,Bz2-dichloro-benzanthrone.
6. Bz1,Bz2-dibromo-benzanthrone.

MELVIN A. PERKINS.